United States Patent [19]

Wada

[11] 4,039,912
[45] Aug. 2, 1977

[54] THREE-PHASE BRUSHLESS DC MOTOR USING TWO HALL EFFECT DEVICES

[75] Inventor: Kinzo Wada, Yokohama, Japan

[73] Assignee: Victor Company of Japan, Limited, Japan

[21] Appl. No.: 624,186

[22] Filed: Oct. 20, 1975

[30] Foreign Application Priority Data

Oct. 30, 1974 Japan .............................. 49-125033
Nov. 22, 1974 Japan .............................. 49-134607

[51] Int. Cl.$^2$ ........................................... H02K 29/00
[52] U.S. Cl. ..................................... 318/254; 318/138
[58] Field of Search ................................. 318/138, 254

[56] References Cited

U.S. PATENT DOCUMENTS

| | | | |
|---|---|---|---|
| 3,898,544 | 8/1975 | Tanikoshi ............................. | 318/254 |
| 3,930,190 | 12/1975 | Liska .................................... | 318/254 |
| 3,938,014 | 2/1976 | Nakajima ........................... | 318/254 X |

*Primary Examiner*—Gene Z. Rubinson
*Attorney, Agent, or Firm*—Robert E. Burns; Emmanuel J. Lobato; Bruce L. Adams

[57] ABSTRACT

A three-phase brushless DC motor has three power transistors with their collector-emitter paths connected to the respective stator windings, three switching transistors with their collector electrodes connected via respective resistors to the negative terminal of a DC voltage source and their emitter electrodes connected in common to the positive terminal of the DC voltage source via a current regulating circuit, and two Hall effect devices each having a pair of control current electrodes and a pair of Hall voltage electrodes. Sinusoidal Hall voltages generated at the Hall electrodes of the Hall effect devices are combined and divided by a voltage dividing network which provides three sinusoidal output voltages. Each of the switching transistors detects the voltage difference between the output voltages. Switching occurs recyclically from one switching transistor to another in response to the output voltage which is higher than any other two output voltages. The base electrodes of the power transistors are connected to the collector electrodes of the switching transistors to provide stator currents in response to the successive switching operations.

9 Claims, 14 Drawing Figures

THREE-PHASE BRUSHLESS DC MOTOR USING TWO HALL EFFECT DEVICES

BACKGROUND OF THE INVENTION

The present invention relates generally to brushless DC motors. More particularly the invention relates to a three-phase brushless DC motor having a permanent magnet rotor and Hall effect devices for commutation of stator currents.

In a prior art three-phase brushless DC motor, Hall effect devices are each associated with each of the three stator windings to effect commutation of the winding currents. However, the operating characteristics of the Hall effect devices, particularly the DC potential at their Hall voltage electrodes, differ from one device to another. The nonuniform characteristics would result in differing winding currents and commutation intervals. Thus, the greater the number of Hall effect devices employed, the more it becomes difficult to provide uniformity to the winding currents and the commutation intervals.

SUMMARY OF THE INVENTION

Therefore, the primary object of the present invention is to minimize the number of Hall effect devices employed for a three-phase brushless DC motor.

A three-phase brushless DC motor of the present invention comprises a permanent magnet rotor, three stator windings mutually displaced electrically by 120°, two Hall effect devices, three power transistors each being associated with each of the three stator windings, three switching transistors each for permitting control of each of the power transistors, and a voltage dividing network. The Hall effect devices have a pair of Hall voltage electrodes and a pair of control current electrodes. The Hall effect devices have their one control current electrodes connected to a positive polarity terminal of a DC voltage source and their opposite electrodes connected to the negative polarity terminal of the DC voltage source. First and second switching transistors are responsive to the Hall voltage delivered from one of the two Hall effect devices, whiile the third switching transistor is responsive to the Hall voltage delivered from at least one of the Hall effect devices. The voltage dividing network is inserted into the connections between the switching transistors and the Hall effect devices so that the Hall voltages are divided into predetermined voltage levels. The stator windings have their one ends connected in common to the positive DC voltage terminal and their opposite ends connected to the negative voltage terminal via the collector-emitter paths of the power transistors. The base electrodes of the power transistors are connected to the collector electrodes of the switching transistors. The switching transistors have their emitter electrodes connected in common to the positive voltage terminal via a current regulating transistor and their collector electrodes connected to the base electrodes of the power transistors respectively to permit successive control of the power transistors. The collector electrodes of the switching transistors are further connected to the negative voltage terminal via respective load resistances so that they constitute a differential amplifier, whereby switching occurs in one of the switching transistors when an input Hall voltage greater than any other two Hall voltages is delivered to that transistor.

In one aspect of the present invention, the Hall effect devices are electrically displaced by 120° + (180° × n) where n is a whole number. In this case, the Hall voltages appearing at the opposite electrodes of each Hall effect device are applied to the base electrode of each switching transistor through the voltage dividing network so that the voltage at the base electrode of each transistor is half as much as the Hall voltage and mutually out of phase by 120°. The switching transistors successively turn on during equal time intervals to permit the power transistors to conduct in succession to generate currents through the stator windings.

In another aspect of the invention, the Hall effect devices are displaced electrically by an angle other than 120° + (180° × $\underline{n}$) where $\underline{n}$ is a whole number as previously described. In this instance, the voltage dividing network delivers different output voltages to the base electrodes of the switching transistors. One of the sinusoidal voltage outputs is higher than any other two output voltages during the interval of 120°. Due to their differential amplifier action, the switching transistors conduct in turn by the recyclically appearing highest output voltage.

BRIEF DESCRIPTION OF THE DRAWINGS

The invention will be fully understood from the following description taken in conjunction with the accompanying drawings, in which.

DESCRIPTION OF THE PREFERRED EMBODIMENTS

Figure 1:
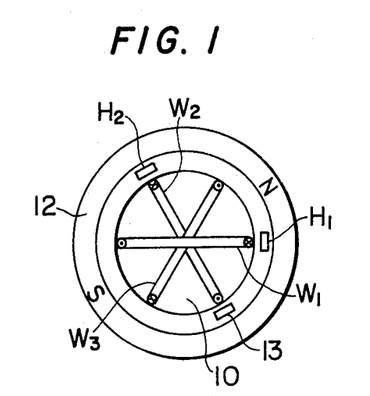
FIG. 1 is a schematic diagram of an embodiment of the brushless DC motor of the invention, showing three stator windings and two Hall effect devices mutually electrically displaced by 120°.
Figure 2:
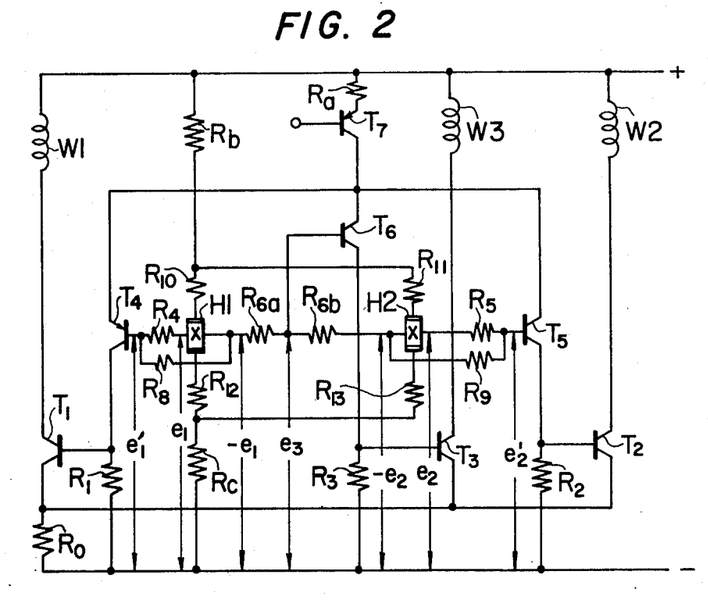
FIG. 2 is a circuit diagram of a first embodiment of the present invention with the Hall effect devices electrically displaced by 120° + (180° × n) from each other.

Referring now to FIGS. 1 and 2, the stator 10 of a brushless DC motor of the invention has winding W1 to W3. The permanent magnet rotor 12 of the motor has diametrically opposed poles N and S. Two Hall effect devices H1 and H2 are arranged in proximity to corresponding stator windings W1 and W2. In accordance with a first preferred embodiment of the invention the two Hall effect devices are displaced by 120° from each other.

Figure 3:
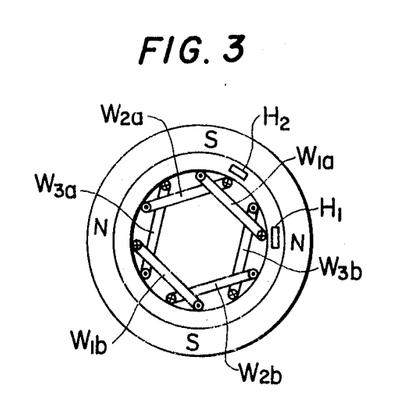
FIG. 3 is a schematic diagram of a modified form of the embodiment of FIG. 1, showing six winding branches electrically displaced by 120° from each other.

The stator windings W1 to W3 have their one ends connected in common to the positive polarity terminal of a DC voltage source (not shown) and their other ends connected to the collector electrode of a corresponding one of power transistors T1 to T3. It is to be noted that the Hall effect device H2 can be located as at 13 in FIG. 1 which is electrically displaced from the Hall effect device H1 by 300° (= 120° + 180°). If each of the stator windings W1 to W3 has a pair of series- or parallel-connected winding branches $a$ and $b$ as shown in FIG. 3, and the rotor has two pairs of magnetic poles, the Hall effect devices H1 and H2 can be electrically displaced by 120° + 180° × $n$ (where $n$ = 0, 1, 2, 3 ...) from each other.

The emitter electrodes of the power transistors T1 to T3 are connected in common to the negative polarity terminal of the DC voltage source via a resistor RO.

To permit the power transistors T1 to T3 to be controlled by the Hall effect devices, the base electrodes of the power transistors T1 and T2 are connected to the collector electrodes of switching transistors T4 to T6, respectively. The emitter electrodes of the switching transistors T4 to T6 are connected in common to the positive polarity terminal of the DC voltage source via the collector to emitter path of a transistor T7 and a resistor Ra. The base electrode of the transistor T7 is to be connected to a source of control signal to effect control of the currents that flow into the respective switching transistors T4 to T6.

The collector electrodes of the switching transistors T4 to T6 are further connected to the negative polarity terminal of the voltage source via resistors R1, R2 and R3, respectively, so that they constitute a differential amplifier. The power transistors T1 to T3 will be turned on by the voltages developed across the resistors R1 to R3, respectively.

To permit the switching transistors T4 to T6 to be controlled by the Hall effect devices, the base electrodes of the switching transistors T4 and T5 are connected to one of the Hall voltage electrodes of the Hall effect devices H1 and H2 via resistors R4 and R5, respectively. The other Hall voltage electrodes of the devices H1 and H2 are connected by resistors R6a and R6b of equal resistance value and further connected to the base electrodes of the switching transistors T4 and T5 via resistors R8 and R9, respectively. The base electrode of the switching transistor T6 is connected to the junction between the resistors R6a and R6b.

The control current electrodes of the Hall effect devices H1 and H2 are connected to the positive polarity terminal of the DC voltage source via resistors R10 and R11, respectively, and via a resistor R$b$. The other control current electrodes of the Hall effect devices H1 and H2 are connected to the negative polarity terminal of the DC voltage source via resistors R12 and R13, respectively, and via a resistor R$c$. The resistors R10, R11, R12 and R13 are provided for the purpose of adjusting the amount of currents that pass through the Hall effect devices, H1 and H2 through their control current electrodes so that the devices H1 and H2 deliver an equal DC potential at their Hall voltage electrodes. If the Hall effect devices H1 and H2 have an equal operating characteristic, the resistors R11 to R13 should be chosen to have an equal resistance. Care must be taken to choose the values of the resistors R11 to R13 if the Hall effect devices H1 and H2 have different operating characteristic so that equal potentials are developed at their Hall voltage electrodes.

With the Hall effect devices H1 and H2 so conditioned to deliver an equal DC potential at their terminals, sinusoidal voltages $e_1$, $-e_1$ and $e_2$, $-e_2$ are delivered from the opposite voltage electrodes of the Hall effect devices H1 and H2, respectively. The voltages $e_1$ and $e_2$ have the same amplitude but are out of phase by 120° from each other.

Figure 6:
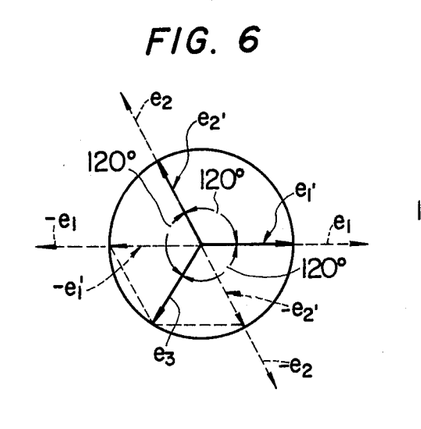
FIG. 6 is a vector diagram of sinusoidal voltages at various points of the circuit of FIG. 2.

A sinusoidal voltage $e_3$ which is a vector sum of voltages $-e_1$ and $-e_2$ develops at the junction between the resistors R6a and R6b and is applied to the base electrode of transistor T6 (see FIG. 6). The voltage $e_3$ is out of phase by 120° from voltages $e_1$ and $e_2$ and has an amplitude half as much as voltages $e_1$ or $e_2$, because the voltages $-e_1$ and $-e_2$ are divided into half by the ratio of resistances R6$a$/R6$a$ + R6$b$ (or R6$b$/R6$a$ + R6$b$).

To permit the switching transistors T4 and T5 to turn on and off at correct timing, voltages $e_1'$ and $e_2'$ applied respectively to their base electrodes are made equal to the voltage $e_3$. Voltage $e_1'$ is derived from a resistor network consisting of the resistors R4 and R8 and voltage $e_2'$ from resistor network consisting of R5 and R9. Voltage $e_1'$ is obtained by the following equation:

$$e_1' = \frac{R8}{R4 + R8} e_1 - \frac{R4}{R4 + R8} e_1 \qquad (1)$$
$$= \frac{R8 - R4}{R4 + R8} e_1$$

If the ratio of resistances R4 to R8 is 1:3, voltage $e_1'$ will become half as much as voltage $e_1$.

Figure 5:
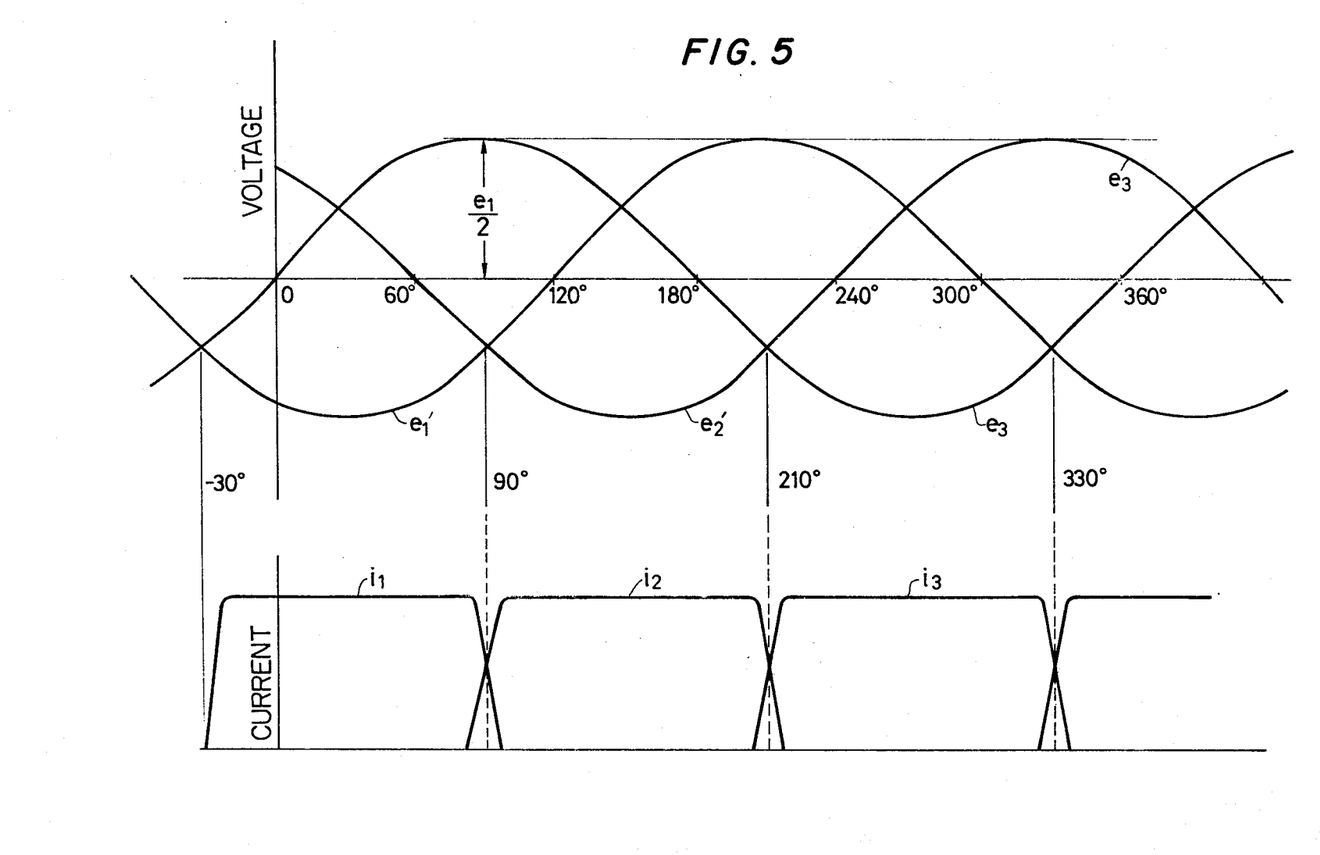
FIG. 5 is a waveform diagram useful for describing the operation of the FIG. 2 circuit.

In a similar manner, if the ratio of resistances R5 to R9 is 1:3, voltage $e_2'$ will become half as much as voltage $e_2$. Since voltages $e_1$ and $e_2$ have the same amplitude, voltages $e_1'$ and $e_2'$ are equal to each other and further equal to voltage $e_3$ and out of phase by 120° from each other as shown in FIG. 5.

Since the switching transistors T4 to T6 form a differential amplifier, the voltage $e_1'$ turns on the transistor T4 during the phase period ranging from −30° to 90°, and voltage $e_2'$ turns on the transistor T5 during the phase period ranging from 90° to 210°, and voltage $e_3$ turns on the transistor T6 during the phase period ranging from 210° to 330°.

Upon the successive switching of transistors T4 to T6, the power transistors T1 to T3 are successively turned on to flow currents $i_1$, $i_2$ and $i_3$ through the windings W1, W2 and W3 and through their respective collector-emitter paths.

Figure 4:
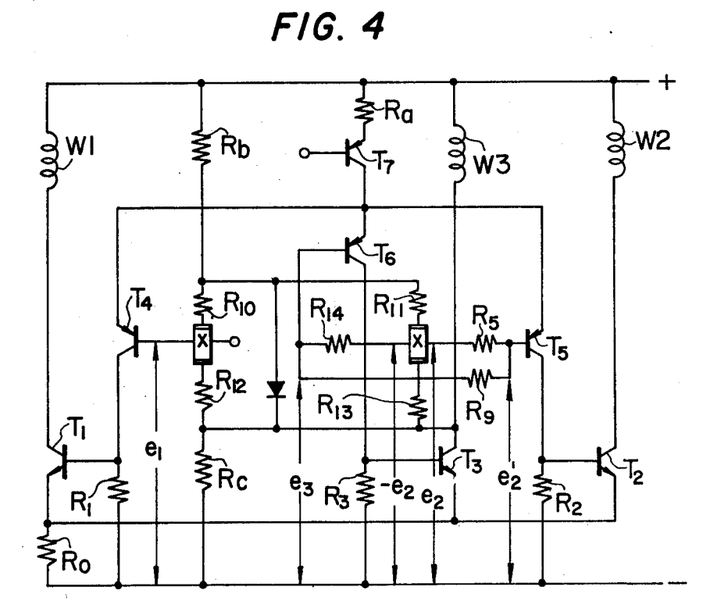
FIG. 4 is a circuit diagram of a second embodiment of the invention with the Hall effect devices electrically displaced by 90° from each other.

The present invention can be modified into a second embodiment shown in FIG. 4. The three-phase brushless DC motor of FIG. 4 is generally similar to that previously shown and described in connection with FIG. 2, but differs in a manner as described below. In FIG. 4, similar parts are identified by similar numerals employed in describing the FIG. 2 embodiment.

One of the voltage electrodes of the Hall effect device H1 is directly connected to the base electrode of the switching transistor T4, while the other voltage electrode being left unconnected. One of the voltage electrodes of the Hall effect device H2 is connected to the base electrode of transistor T5 via resistor R5 and further connected to the other voltage electrode via resistors R5, R9 and R14. The base electrode of the switching transistor T6 is connected to the other voltage electrode of Hall effect device H2 via the resistor R14.

Figure 7:
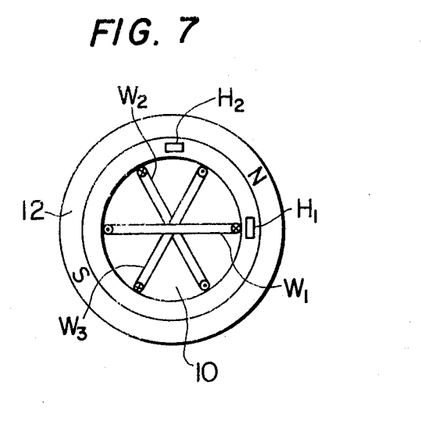
FIG. 7 is a schematic diagram of the brushless DC motor of the invention in which the Hall effect devices are electrically displaced by 90°.

In the present embodiment, the Hall effect devices H1 and H2 are displaced electrically by an angle other than that described in the previous embodiment, such as illustrated in FIG. 7 in which the Hall effect device H2 is displaced electrically by 90° from the device H1.

With these arrangements, it is assumed as in the previous embodiment that the Hall effect devices H1 and H2 deliver the same DC potential to their respective voltage electrodes. Sinusoidal voltages $e_1$ and $e_2$ derived from the corresponding voltage electrodes of the Hall effect devices H1 and H2 can be given as follows:

$$e_1 = -E \cos \theta$$

$$e_2 = -E \cos (\theta - 90°)$$

where E is the peak amplitude.

The values of resistances R5, R9 and R14 are selected such that the resistors R5 and R14 have equal resistances and the ratio of resistances of R5 to R9 is approximately 1:2.73. The voltage $e_2'$ applied to the base electrode of transistor T5 is given as follows:

$$e_2' = \frac{R14 + R9}{R5 + R14 + R9} e_2 - \frac{R5}{R5 + R14 + R9} e_2 \quad (2)$$

$$= -\frac{R5 + R9}{2R5 + R9} E \cos (\theta - 90°) +$$

$$\frac{R5}{2R7 + R9} E \cos (\theta - 90°)$$

$$= -\frac{3.73 \, E \sin \theta}{4.73} + \frac{E \sin \theta}{4.73}$$

$$= -0.577 \, E \sin \theta$$

Likewise, the voltage $e_3$ at the base electrode of transistor T6 is given by $$e_3 = +0.577 \, E \sin \theta \quad (3)$$

Figure 8:
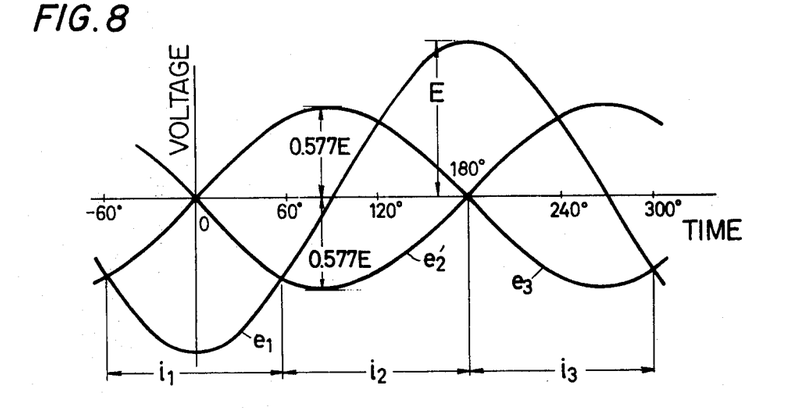
FIG. 8 is a waveform diagram useful for describing the operation of the FIG. 4 circuit.

Therefore, voltages $e_2'$ and $e_3$ are out of phase by 180° and have the same peak voltage which is 0.577 times the peak amplitude of voltage $e_1$. The resulting voltage curves are illustrated in FIG. 8. Since the switching transistors T4 to T6 are connected in the same circuit configuration as the circuit of the previous embodiment to form a differential amplifier, transistor T4 turns on during the period between −60° and +60° by the voltage $e_1$. In the succeeding period from 60° to 180° transistor T5 will be turned on by the voltage $e_2'$. Likewise, transistor T6 will turn on during the period from 180° to 300° by the voltage $e_3$. It will then be understood that the stator currents $i_1$, $i_2$ and $i_3$ flow during distinct time intervals of 120°.

Figure 9:
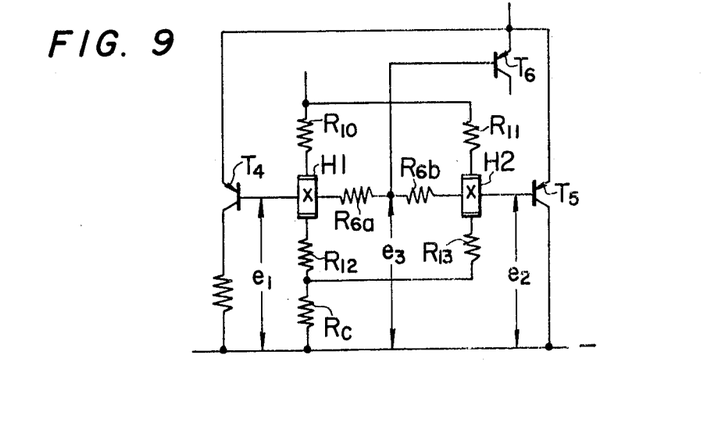
FIG. 9 is a circuit diagram of a modified embodiment in which the Hall effect devices are electrically displaced by 98.2° from each other.

An alternative embodiment of the circuit of FIG. 4 is shown in FIG. 9. In this embodiment, the Hall effect devices H1 and H2 are displaced electrically by 98.2° from each other and corresponding ones of their voltage electrodes are connected by resistors R15 and R16 of equal resistances, the junction between the resistors R15 and R16 being connected to the base electrode of transistor T6. The other voltage electrodes of the Hall effect devices H1 and H2 are directly connected to the base electrodes of transistors T4 and T5, respectively.

With the Hall effect devices H1 and H2 so arranged and connected, voltages $e_1$ and $e_2$ which appear at the base electrodes of transistors T4 and T5, respectively, are given by $$e_1 = -E \cos \theta$$

$$e_2 = -E \cos (\theta - 98.2°)$$

then, voltage $e_3$ which is applied to the base electrode of transistor T6 will be given by $$e_3 = \frac{E}{2} \{\cos \theta + \cos (\theta - 98.2°)\} \quad (4)$$

$$= E \cos (\theta - 49.1°) \cos 49.1°$$

$$= 0.655 \, E \cos (\theta - 49.1°)$$

Figure 13:
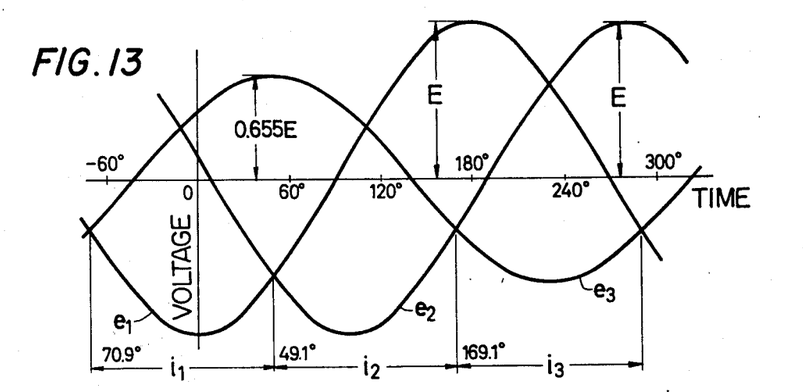
FIG. 13 is a waveform diagram useful for describing the operation of the FIG. 9 circuit.

The resulting voltage curves are depicted in FIG. 13. It will be understood from FIG. 13 that transistor T4 conducts during the period from −70.9° to +49.1°, transistor T5 conducts during the period from 49.1° to 169.1°, and transistor T6 during the period from 169.1° to 289.1°.

Figure 10:
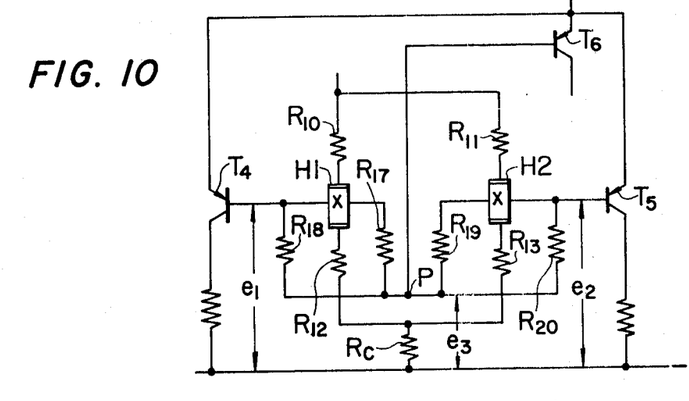
FIG. 10 is a circuit diagram of a second modified embodiment of the invention in which the Hall effect devices are electrically displaced by 60° from each other.
Figure 11:
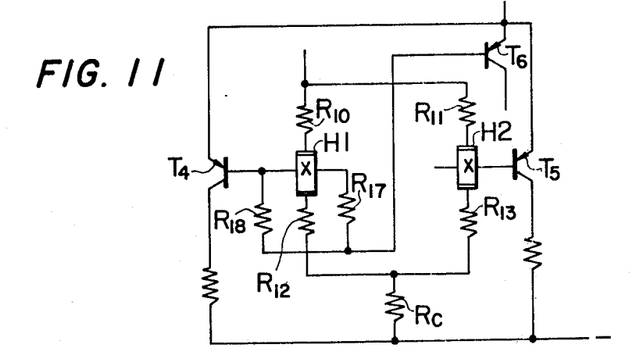
FIGS. 11 and 12 are circuit diagrams of alternative embodiments of the FIG. 10 circuit.
Figure 12:
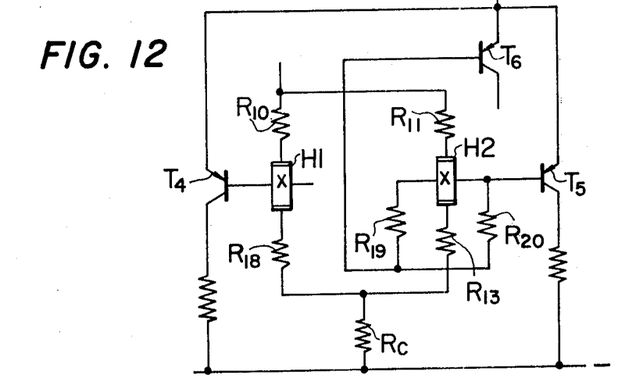

Further alternative embodiments are shown in FIGS. 10 to 12. In this embodiment, the Hall effect devices H1 and H2 are electrically displaced by 60°. The voltage electrodes of Hall effect device H1 are connected together by resistors R17 and R18 of equal resistances. Similarly, the voltage electrodes of Hall effect device H2 are connected by resistors R19 and R20. The junction between resistors R17 and R18 and the junction between resistors R19 and R20 are connected at point P to which is also connected the base electrode of transistor T6. The corresponding ones of the voltage electrodes of Hall effect devices H1 and H2 are directly connected to the base electrodes of transistors T4 and T5, respectively.

With this arrangement, voltages $e_1$ and $e_2$ appearing at the base electrodes of transistors T4 and T5, respectively, are given by $$e_1 = -E \cos \theta$$

$$e_2 = -E \cos (\theta - 60°)$$

Since the voltage electrodes of the Hall effect devices H1 and H2 are connected together by equal resistances, voltage $e_3$ developed at the point P, and hence at the base electrode of transistor T6, is zero. This gives voltage curves as shown in FIG. 14.

Figure 14:
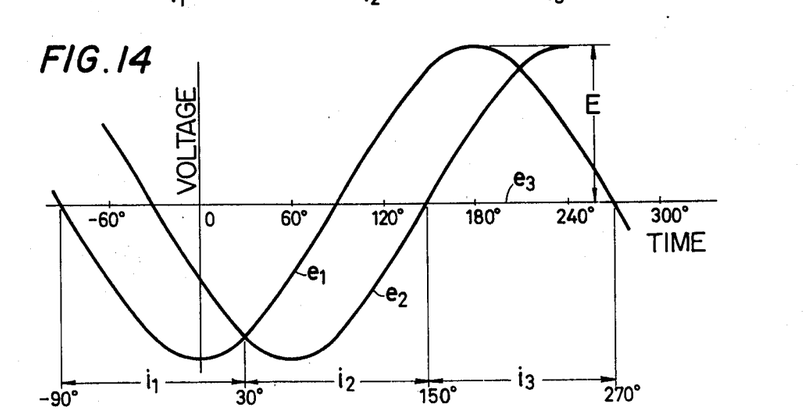
FIG. 14 is a waveform diagram useful for describing the operation of the circuits of FIGS. 10 to 12.

As is clearly seen from FIG. 14, transistor T4 is in the conducting state during the period from −90° to +30°, transistor T5 being conductive during the period from 30° to 150°. Although the base electrode of transistor T6 is maintained at zero potential, transistor T6 will turn on during the period from 150° to 270° because its base potential falls below the potentials at the base electrodes of transistors T4 and T5 during that phase interval.

The circuit of FIG. 10 can be modified apparently to circuit configurations as illustrated in FIGS. 11 and 12. In the circuit of FIG. 11, the voltage electrodes of the Hall effect device H1 are connected together by resistors R17 and R18 of equal resistance, the junction between resistors R17 and R18 being coupled to the base electrode of transistor T6, and one of the Hall voltage electrodes being coupled to the base electrode of transistor T4. One of the voltage electrodes of Hall effect device H2 is connected directly to the base of transistor T5 while the other electrode is left unconnected. In the circuit of FIG. 12, the voltage electrodes of the Hall effect device H2 are connected together by resistors R19 and R20 of equal resistances, the junction between the two resistors being connected to the base electrode of transistor T6, and one of its Hall voltage electrodes being connected to the base electrode of transistor T5. One of the voltage electrodes of Hall effect device H1 is connected directly to the base of transistor T4 while the other electrode is left unconnected.

In the foregoing there has been described a three-phase brushless DC motor using two Hall effect devices and a voltage dividing network for providing three output voltages to drive respective switching transistors during equal time intervals. The voltage dividing network may be modified further in correspondence with the arrangement of the Hall effect devices electrically displaced by an angle other than the angles as referred to in the foregoing description. Therefore, the embodiments shown and described are only illustrative, not restrictive.

What is claimed is:

1. A three-phase brushless DC motor comprising a permanent magnet rotor; three stator windings mutually displaced electrically by 120°; first and second Hall effect devices associated with the stator windings and electrically displaced from each other by a predetermined amount, said Hall effect devices having a pair of first and second Hall voltage electrodes and a pair of control current electrodes, the stator windings having their one ends connectable in use in common to a first terminal of a DC voltage source; first, second and third power transistors each having emitter, base and collector electrodes and a collector-emitter path, the other end of each of the stator windings being connectable in use to a second terminal of the DC voltage source via the collector-emitter path of a corresponding one of the power transistors; first, second and third switching transistors of opposite conductivity type to said power transistors, each having base, emitter and collector electrodes, the first, second and third switching transistors having their emitter electrodes connectable in use in common to the first terminal of the DC voltage source; the base electrodes of the first and second switching transistors being connected to at least one of the first and second Hall voltage electrodes of the first and second Hall effect devices respectively, and the base electrode of the third switching transistor being connected at least one of the second voltage electrodes of the first and second Hall effect devices; a voltage dividing network in at least one of the connections between said base electrodes of the first, second and third switching transistors and the Hall voltage electrodes, the base electrodes of the first, second and third power transistors being connected to the collector electrodes of the first, second and third switching transistors respectively, one of the control current electrodes of the Hall effect devices being connectable in use to the first terminal of said DC voltage source and the other control current electrode of the Hall effect device being connectable in use to the second terminal of said DC voltage source, the electrical displacement between the first and second Hall effect devices and the voltage divisions of the voltage dividing network being such that the first, second and third switching transistors successively turn on at equal intervals.

2. A three-phase brushless DC motor as claimed in claim 1, wherein said Hall effect devices are electrically displaced by 120° + (180° × $n$) where $n$ is a whole number, and wherein said voltage dividing network comprises a first and a second resistor the first resistor circuit connected across the first and second Hall voltage electrodes of the first Hall effect device and the second resistor circuit connected across the first and second Hall voltage electrodes of the second Hall effect device, and a third resistor circuit connected across the second Hall voltage electrodes of the first and second Hall effect devices.

3. A three-phase brushless DC motor as claimed in claim 2, wherein each of the first and second resistor circuits comprises a first resistor connected between the first Hall voltage electrode of the corresponding one of the Hall effect devices and the base electrode of the corresponding one of the first and second switching transistors, and a second resistor connected across the first and second Hall voltage electrodes of the corresponding one of the Hall effect devices, the ratio of resistances of the first to second resistors being 1 to 3.

4. A three-phase brushless DC motor as claimed in claim 2, wherein said third resistor circuit comprises series-connected first and second resistors of equal resistances connected across the second Hall voltage electrodes of the first and second Hall effect devices, the junction between the first and second resistors being connected to the base electrode of the third switching transistor.

5. A three-phase brushless DC motor as claimed in claim 1, comprising a current regulating means, and wherein the emitter electrodes of the first, second and third switching transistors are connectable in use to the first terminal of the DC voltage source via the current regulating means.

6. A three-phase brushless DC motor comprising a permanent magnet rotor; three stator windings mutually displaced electrically by 120°; first and second Hall effect devices associated with the stator windings and electrically displaced from each other by a predetermined amount, said Hall effect devices having a pair of first and second Hall voltage electrodes and a pair of control current electrodes, the stator windings having their one ends connectable in use in common to a first terminal of a DC voltage source; first, second and third power transistors each having emitter, base and collector electrodes and a collector-emitter path, the other end of each of the stator windings being connectable in use to a second terminal of the DC voltage source via the collector-emitter path of a corresponding one of the power transistors; first, second and third switching transistors of opposite conductivity type to said power transistor, each having base, emitter and collector electrodes, the first, second and third switching transistors having their emitter electrodes connectable in use in common to the first terminal of the DC voltage source and their collector electrodes connectable in use to the second terminal of the DC voltage source via respective resistors to form a differential amplifier; the base electrodes of the first and second switching transistors being connected to at least one of the first and second Hall voltage electrodes of the first and second Hall effect devices respectively, and the base electrode of the third switching transistor being connected to at least one of the second voltage electrodes of the first and second Hall effect devices; a voltage dividing network in at least one of the connections between said base electrodes of the first, second and third switching transistors and the Hall voltage electrodes, the base electrodes of the first, second and third power transistors being connected to the collector electrodes of the first, second and third switching transistors respectively, one of the control current electrodes of the Hall effect devices being connectable in use to the first terminal of said DC voltage source and the other control current electrode of the Hall effect device being connectable in use to the second terminal of said DC voltage source, the electrical displacement between the first and second Hall effect devices and the voltage divisions of the voltage dividing network being such that the first, second and third switching transistors successively turn on at equal intervals.

7. A three-phase brushless DC motor as claimed in claim 6, wherein the first and second Hall effect devices are electrically displaced by 90° from each other, and wherein said voltage dividing network comprises first, second and third resistors, the first resistor being connected between the first Hall voltage electrode of the second Hall effect device and the base electrode of the second switching transistor, the second and third resistors being connected in series between the second Hall voltage electrode of the second Hall effect device and the base electrode of the seccond switching transistor, the junction between the second and third resistors being connected to the base electrode of the third switching transistor, the ratio of resistances of the first to second resistors being 1 to 2.73 and the first to third resistors being 1 to 1, and wherein the base electrode of the first switching transistor is connected directly to the first Hall voltage electrode of the first Hall effect device.

8. A three-phase brushless DC motor as claimed in claim 6, wherein the first and second Hall effect devices are electrically displaced by 98.2° from each other, and wherein said voltage dividing network comprises a first and a second resistor of equal resistances connected in series together across the second Hall voltage electrodes of the first and second Hall effect devices, the junction between the first and second resistors being connected to the base electrode of the third switching transistor, and wherein the base electrodes of the first and second switching transistors are connected to the first Hall voltage electrodes of the first and second Hall effect devices respectively.

9. A three-phase brushless DC motor as claimed in claim 6, wherein the first and second Hall effect devices are electrically displaced by 60° from each other, and wherein said voltage dividing network comprises a first and a second resistors of equal resistance connected in series together across the first and second Hall voltage electrodes of at least one of the first and second Hall effect devices, the junction between the first and second resistors being connected to the base electrode of the third switching transistor.

* * * * *